June 3, 1958
H. W. NEWSON
2,837,475
NEUTRONIC REACTOR HAVING LOCALIZED AREAS
OF HIGH THERMAL NEUTRON DENSITIES
Filed Aug. 21, 1952
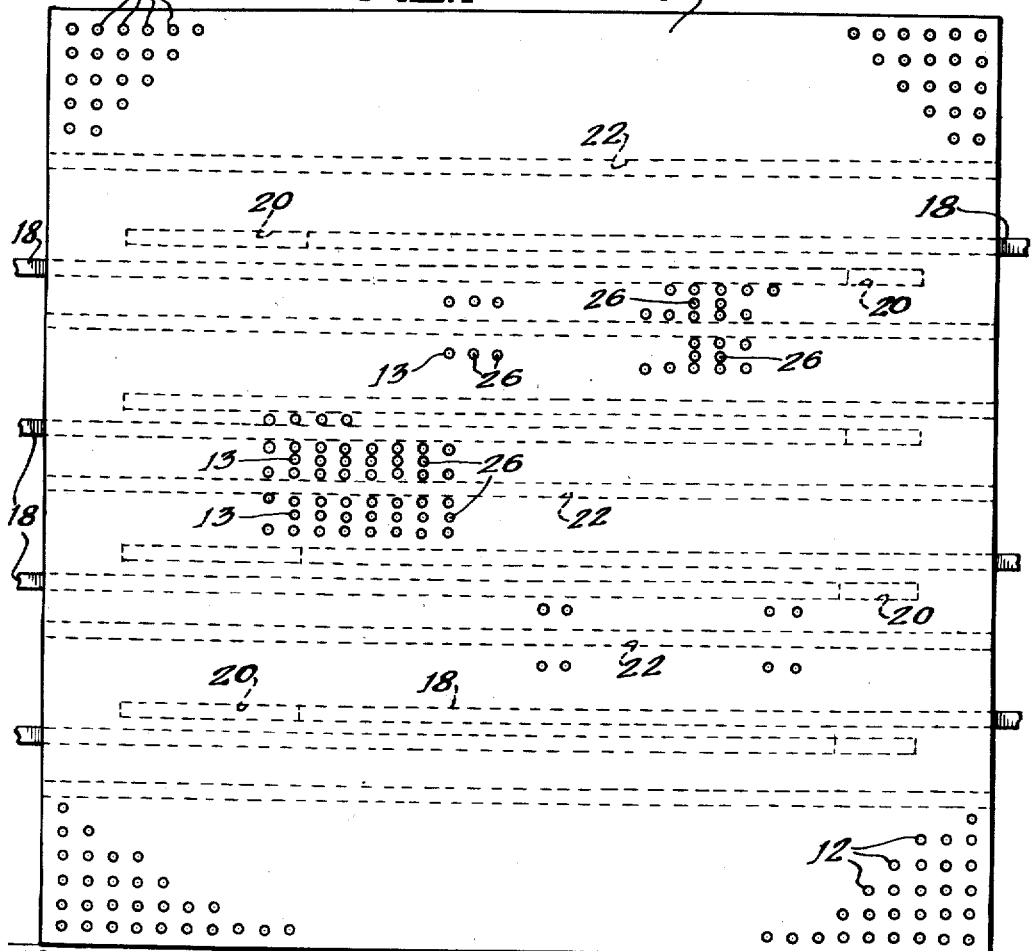
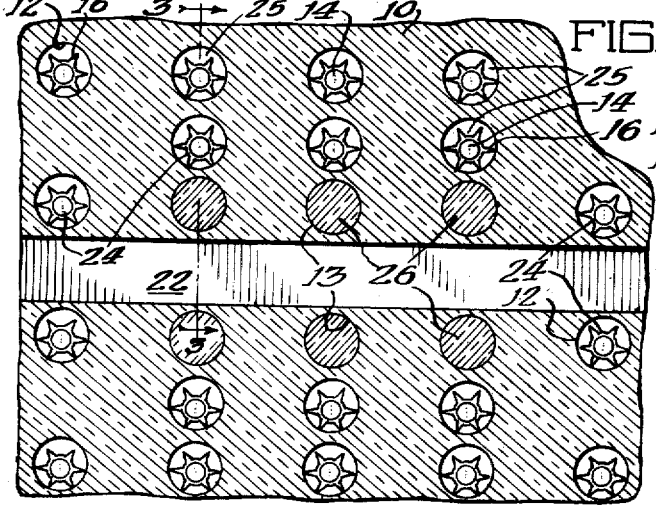
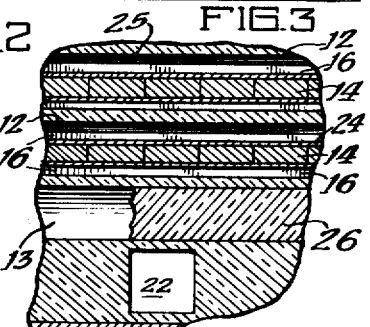
INVENTOR.
Henry W. Newson
BY Roland A. Anderson
Attorney United States Patent Office 2,837,475
Patented June 3, 1958

2,837,475

NEUTRONIC REACTOR HAVING LOCALIZED AREAS OF HIGH THERMAL NEUTRON DENSITIES

Henry W. Newson, Durham, N. C., assignor to the United States of America as represented by the United States Atomic Energy Commission Application August 21, 1952, Serial No. 305,597

2 Claims. (Cl. 204—193.2)

The present invention relates to a neutronic reactor that has a localized area in which a higher thermal neutron flux density exists than would normally be expected from the nuclear construction and operating power level of the reactor, and also relates to methods of constructing lattice-type neutronic reactors in which the thermal neutron flux density in a localized area of the reactor is significantly greater than would be expected from the thermal neutron flux density in other areas of the reactor.

When a neutron is ejected from a body of fissionable material, it has a relatively high energy level. The fission cross section, or the probability of a neutron being absorbed in the material to produce fission of the nucleus, of known materials is much less for incident neutrons of high energies than it is for incident neutrons of thermal energy. For this reason, many neutronic reactors require the use of neutron moderating material to reduce the energy level of the fast neutrons within the reactor to approximately thermal energy level in order to maintain a chain neutron reaction. Such reactors having moderator material generally are either of the slurry, or the lattice type; the slurry type using a liquid moderator intermixed with small particles of fissionable material, and the lattice type using a moderator with relatively large bodies of fissionable material spaced in a geometric pattern throughout at least a portion of the moderator. The present invention is an improvement in the lattice type of neutronic reactor. For a more detailed description of a lattice type neutronic reactor, reference is made to Fermi et al. Patent 2,708,656, dated May 17, 1955.

One of the applications of neutronic reactors is the irradiation of substances with neutrons. Radioactive isotopes of various elements may be produced by subjecting them to neutron bombardment within a neutronic reactor. However, it has been found that the most effective neutron radiation for purposes of isotope transformation is that of thermal energy, rather than the higher energies. Hence, it is an object of the present invention to provide a neutronic reactor with a localized area in which the concentration of thermal neutrons is greater than would be normally expected from the power level and nuclear construction of the reactor.

Other objects and advantages of the present invention will be apparent to the man skilled in the art upon a further reading of the specification, particularly when considered in the light of the drawings, in which:

Figure 1 is an elevational view of one face of a lattice type neutronic reactor;

Figure 2 is a fragmentary sectional view of a portion of the reactor taken parallel to the face of the reactor shown in Figure 1; and Figure 3 is a sectional view taken along line 3—3 of Figure 2.

The reactor has a moderator which may consist of a large cube 10 of graphite. A large number of channels 12 extend horizontally through the cube 10 parallel to each other. The channels 12 are equally spaced to form a geometric lattice, except as will be set forth hereinafter. Within at least some of the channels 12 are disposed bodies 14 of material that will fission and which have a higher fission cross section for thermal neutrons than for fast neutrons. The bodies 14 of fissionable material are disposed within sealed cylindrical containers 24 which are provided with longitudinal fins 16 equally spaced about the periphery thereof. The channels 12 are cylindrical in shape, and have a diameter slightly greater than the diameter of the cylindrical container 24 including the fins 16. As a result there is a space 25 suitable for conducting a fluid coolant disposed throughout the channels 12 between the container 24 and the graphite moderator 10. Air may be circulated through this space 25, although other fluids have been found to have smaller neutron absorption cross sections, i. e. a smaller probability of non-fission absorption of a neutron.

Neutron absorbing rods 18 are horizontally disposed within tubular channels 20 extending into the graphite cube 10. The rods 18 are constructed of material which will readily absorb neutrons, such as boron steel, but as in the case of fission producing absorption, thermal neutrons are more readily absorbed by the control rods 18 than neutrons of greater energies.

Experimental rectangular ducts 22 traverse the graphite cube 10 normal to the fissionable material bearing channels 12 for the purpose of providing access to the interior of the reactor, so that the reactor may be used to irradiate substances.

The cube 10 of graphite is constructed of neutronically pure graphite to reduce the absorption of neutrons in the graphite cube 10 to a minimum. Natural uranium may be used for the fissionable bodies 14 as well as plutonium, and the container 24 and fins 16 may be constructed of aluminum, or some other neutron permeable material with a small neutron capture cross section. With this construction, it has been found that the most efficient lattice structure for maintaining a thermal neutron chain reaction is one in which the channels 12 containing fissionable bodies 14 are disposed parallel to each other and spaced 8 inches between centers. The graphite cube 10 in this construction measures 25 feet on each side and may be constructed of 4 inch square graphite bars. It has been found that in this construction a neutronic chain reaction will be sustained when there are approximately 1,089 adjacent channels bearing natural uranium within the cube 10, or approximately 93.5 tons of natural uranium disposed within the moderator. The uranium bearing channels 12 have a diameter in this construction of 2.67 inches, and are disposed at a distance of 8 inches between centers. The natural uranium bodies 14 are cylindrical in shape with a diameter of 1.1 inch and a length of 4 inches. The container 24 may be 11 feet long and contain 33 bodies 14 of natural uranium. The maximum dimensions across the fins 16 of the container 24 should not greatly exceed 2.37 inches in order to permit the easy removal of the fuel elements from the reactor. As stated above, it will be necessary to cool the bodies 14 of fissionable material by circulating a coolant, such as air, through the channels, if it is desired to operate the reactor at any appreciable power level. With the foregoing construction, it has been found that an air coolant at room temperature flowing at the rate of 220,000 cubic feet per minute is adequate to permit the neutronic reaction to increase until the flux density at the center of the graphite cube 10 is maintained at approximately $4 \times 10^{12}$ neutrons per second per square centimeter.

In the reactor described above, it is clear that the maximum thermal neutron flux density between adjacent fissionable material bearing channels 12 will occur midway between the channels 12, and at this point there will be a minimum fast neutron flux density. It is equally clear, that the concentration of thermal neutrons in the vicinity of the absorption control elements 18 will be relatively small compared to the concentration of neutrons of the higher energies at these locations. It is for this reason, that the duct 22 which is used to irradiate bodies with neutrons is disposed midway between fissionable material bearing channels 12 and relatively remote from the absorbing control elements 18. It is also clear that in this construction, the magnitude of the thermal neutron flux density within the duct 22 is a function of the lattice structure, the power level of the reactor, and the location of the duct 22 relative to the center of the moderating cube 10. The ratio of thermal neutrons to total neutrons within a duct disposed centrally between adjacent fissionable material bearing channels 12 should not be greatly different throughout the reactor, but in the center portion of the reactor the total neutron flux density will, of course, be greatest.

The lattice structure in a neutronic reactor is selected for one of several reasons. The usual lattice structure has been selected to minimize the total amount of fissionable material required to make the reactor self-sustaining. The lattice structure may also be chosen to give the reactor a maximum possible neutron reproduction ratio for a given size and given quantity of fissionable material. The reproduction ratio of a neutronic reactor is a constant which must be greater than unity for a self-sustaining reactor and which represents a statistical average for the number of neutrons ejected by a single fission which are free to enter into a new fission. The lattice structure may also be selected to minimize the non-fission absorption of neutrons within the bodies of fissionable material 14. The lattice structure disclosed in this reactor uses parallel fissionable material bearing channels 12 spaced 8 inches between centers. This particular lattice has been selected to minimize the amount of fissionable material required, however, both of the other factors enter into the selection of the particular lattice structure used. The aforementioned Fermi et al. Patent 2,708,656, dated May 17, 1955, describes both theoretical and experimental methods of determining lattice structures for neutronic reactors.

According to the present invention, the lattice structure of the reactor is distorted in the vicinity of the experimental ducts 22 in order to increase the thermal neutron content of the neutron flux density within the duct 22. The uranium bearing channels 12 adjacent to the experimental ducts 22 are disposed at a distance from the center of the ducts 22 equal to the distance between adjacent fissionable material bearing channels 12 in the desired lattice structure. This, of course, means that the fissionable material bearing channels 12 adjacent to the ducts 22 are only one-half the distance from the adjacent fissionable material bearing channels 12 than in other portions of the reactor, and that the optimum conditions derived from the particular lattice structure are sacrified in this portion of the reactor. Each of the top and bottom rows of ducts 12 in Fig. 2 has a center-to-center spacing from the duct 22 of 1.5 times the normal center-to-center spacing between ducts 12, in other words, 12 inches, and each of the ducts 12 directly above and below the duct 22 has a center-to-center spacing from the duct 22 of .5 times said normal spacing, in other words, 4 inches. Three intermediate ducts 12 in each of the rows directly above and below the duct 22 are closed by plugs 26. Those ducts 12 directly above and below the plugged ducts 12 have a center-to-center spacing from the duct 22 of 1.0 times the normal spacing between ducts 12, in other words, 8 inches, and a center-to-center spacing from the top and bottom rows, respectively, of 0.5 times the normal spacing between ducts 12, in other words, 4 inches. The distortion of the lattice, according to this invention, does not appreciably change the total amount of fissionable material required within the reactor from that required by a similar reactor with an undistorted lattice structure, but merely displaces the bodies of fissionable material 14 which are adjacent to the experimental ducts 22 to a distance from the ducts 22 equal to the distance between adjacent fissionable bodies in the lattice structure.

This invention may be practical as a modification of an existing neutronic reactor in which bodies of fissionable material 14 are disposed within a solid moderator 10. In this case, new channels 13 for bearing fissionable material are placed within the graphite cube 10 at a distance from the experimental duct 22 equal to the distance between fissionable material bearing channels 12 in the desired lattice structure of the reactor. The former fissionable material bearing channels 12 which are adjacent to the duct 22 are closed with plugs 26 of graphite moderator material.

By means of this construction, the thermal neutrons flux within the experimental duct may be approximately doubled by the use of an optimum arrangement without increasing the dimensions of the reactor or appreciably effecting the amount of fissionable material necessary to make the neutronic reaction self-sustaining. Some decrease in the power level of the reaction may be required because the regions of higher thermal flux density may also become local "hot spots" within the reactor due to the greater absorption of neutrons within this area. For this reason, the temperature at the duct 22 in the reactor will determine the maximum power level to which the reaction may be permitted to rise. However, even as the lower power level required to keep the hottest spot in the reactor within permissible limits, it has been found that the thermal neutron flux density within the duct 22 will exceed that existing in a similar reactor operating at approximately the same temperature and having a lattice structure which has not been distorted in accordance with the present invention.

It is thus clear, that the neutronic reactor described provides localized area of higher thermal neutron flux density for a given power level than has heretofore been known to the man skilled in the art. Many modifications and improvements upon reactors may now be within the skill of the man in the art as a result of the teachings herein presented. For this reason, it is intended that the scope of the present invention be not limited to the specific disclosure, but rather by the appended claims.

What is claimed is:

1. A neutronic reactor having an active portion including a graphite moderator at least 25 feet in length along each axis, a plurality of parallel channels traversing said moderator, said channels being disposed within a geometric lattice with adjacent channels spaced from each other by a distance of approximately 8 inches, a plurality of cylindrical bodies of natural uranium disposed within at least 1089 of said channels, said uranium bodies having a diameter of approximately 1.1 inch and being jacketed in a thin aluminum jacket, the total amount of natural uranium being approximately 93.5 tons, and the diameter of the channels being greater than 1.1 inch characterized by the improved construction wherein a duct traverses the moderator normal to some channels, and the channels adjacent to at least a portion of the duct are displaced from the lattice and disposed 8 inches from the duct, said channels being approximately 4 inches from adjacent channels, each of said channels containing one of said uranium bodies.

2. A neutronic reactor comprising a graphite moderator having a duct for irradiating samples with thermal neutrons and a plurality of parallel channels arranged in four rows in square-lattice pattern with a center-to-center distance of 8 inches from one another and lying on both sides of the duct so that the two rows of channels adjacent opposite sides of the duct have a center-to-center spacing from the duct of 4 inches and the two remaining rows have a center-to-center spacing of 12 inches, intermediate channels of the said two rows adjacent the duct being plugged with graphite, the moderator further having additional parallel channels arranged in two lines on the sides of the plugged channels away from the duct, the said additional channels of each line having a center-to-center distance of 8 inches from one another and from the duct and a center-to-center distance of 4 inches from the plugged channels on the same side of the duct, and bodies of natural uranium disposed in each of the aforementioned channels except the plugged channels.

References Cited in the file of this patent

UNITED STATES PATENTS 2,708,656     Fermi et al. _____ May 17, 1955

OTHER REFERENCES

The Science and Engineering of Nuclear Power (an article by Hughes) by Clark Goodman, vol. 1, pub. by Addison-Wesley Press, Cambridge, Mass., 1947, pages 309–315; vol. 2, pub. 1949, pages 74–76.

Nucleonics, February 1950, pages 5–17.

Atoms, vol. 6, Nov.-Dec. 1950, pages 4–20.

Atomics (Great Britain), June 1951, pages 176–180 (an article on Bepo).

Atomics (Great Britain), February 1951, pages 51–55 (an article on Gleep).